(12) United States Patent
Szolak et al.

(10) Patent No.: US 12,253,018 B2
(45) Date of Patent: Mar. 18, 2025

(54) TURBOCHARGER

(71) Applicant: FRAUNHOFER-GESELLSCHAFT ZUR FÖRDERUNG DER ANGEWANDTEN FORSCHUNG E.V., Munich (DE)

(72) Inventors: Robert Szolak, Freiburg (DE); Paul Beutel, Freiburg (DE); Bernd Danckert, Mauren (LI)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/534,893

(22) Filed: Dec. 11, 2023

(65) Prior Publication Data

US 2024/0110498 A1 Apr. 4, 2024

Related U.S. Application Data

(63) Continuation of application No. PCT/EP2022/065807, filed on Jun. 10, 2022.

(30) Foreign Application Priority Data

Jun. 11, 2021 (DE) .......................... 102021205972.4

(51) Int. Cl.
*F01N 3/28* (2006.01)
*F01N 3/10* (2006.01)
(Continued)

(52) U.S. Cl.
CPC ................ *F01N 3/28* (2013.01); *F02B 37/18* (2013.01); *F01N 3/106* (2013.01); *F01N 13/009* (2014.06);
(Continued)

(58) Field of Classification Search
CPC .......... F01N 3/28; F01N 3/106; F01N 13/009; F01N 2270/00; F01N 2340/06;
(Continued)

(56) References Cited

U.S. PATENT DOCUMENTS

| 4,122,673 | A | 10/1978 | Leins | |
|---|---|---|---|---|
| 2006/0021332 | A1* | 2/2006 | Gaiser | F01N 5/02 60/297 |

(Continued)

FOREIGN PATENT DOCUMENTS

| DE | 10 2010 043 327 A1 | 5/2012 |
|---|---|---|
| DE | 10 2017 201 468 A1 | 8/2018 |

(Continued)

OTHER PUBLICATIONS

Machine Translation of WO-2018141608-A1 (Year: 2018).*

(Continued)

*Primary Examiner* — Brandon D Lee
(74) *Attorney, Agent, or Firm* — Womble Bond Dickinson (US) LLP

(57) ABSTRACT

A turbocharger has compressor arrangement configured to compress the fresh air of an internal combustion engine. The turbocharger has at least one compressor housing (with a fresh air inlet) and a fresh air outlet. At least one compressor impeller is arranged in the compressor housing, and with at least one exhaust gas turbine for driving the compressor arrangement, with at least one turbine housing with an exhaust gas inlet and an exhaust gas outlet. At least one turbine wheel is arranged in the turbine housing. A heated catalytic converter is configured to at least partially convert supplied fuel with fresh air and/or exhaust gas. The heated catalytic converter includes a catalytic converter housing with a gas inlet and a gas outlet and a fuel inlet. The catalytic (Continued)

converter housing and the compressor housing and/or the turbine housing are in thermal contact on at least one part surface.

16 Claims, 4 Drawing Sheets

(51) Int. Cl.
*F01N 13/00* (2010.01)
*F02B 37/18* (2006.01)
*F02C 6/12* (2006.01)

(52) U.S. Cl.
CPC ...... *F01N 2270/00* (2013.01); *F01N 2340/06* (2013.01); *F02C 6/12* (2013.01); *F05D 2230/21* (2013.01); *F05D 2230/53* (2013.01); *F05D 2250/40* (2013.01)

(58) Field of Classification Search
CPC .......... F01N 3/2033; F01N 3/36; F02B 37/18; F02B 37/00; Y02T 10/12
See application file for complete search history.

(56) References Cited

U.S. PATENT DOCUMENTS

| | | | |
|---|---|---|---|
| 2013/0283781 A1* | 10/2013 | Klingbeil | F02B 29/0481 |
| | | | 60/605.1 |
| 2020/0208571 A1* | 7/2020 | Sidles | G01M 13/00 |
| 2021/0348520 A1 | 11/2021 | Cooley et al. | |
| 2022/0010712 A1 | 1/2022 | Szolak et al. | |
| 2023/0417167 A1* | 12/2023 | Brinkert | F01N 3/2033 |
| 2024/0026811 A1* | 1/2024 | Slavic | F01D 9/026 |

FOREIGN PATENT DOCUMENTS

| | | |
|---|---|---|
| DE | 10 2019 210 328 A1 | 1/2021 |
| EP | 1882831 A1 | 1/2008 |
| JP | S 63309727 A | 12/1988 |
| WO | WO-2018141608 A1 * | 8/2018 |

OTHER PUBLICATIONS

International Search Report issued Sep. 23, 2022 in PCT/EP2022/065807 (English translation).
Written Opinion issued Sep. 23, 2022 in PCT/EP2022/065807 (machine English translation).

* cited by examiner

TURBOCHARGER

RELATED APPLICATIONS

This is a Bypass Continuation of PCT/EP2022/065807, filed Jun. 10, 2022, and published as WO 2022/258801A1 on Dec. 15, 2022. Priority is claimed to DE 10 2021 205 972.4, filed Jun. 11, 2021. The contents of the aforementioned applications are incorporated by reference in their entirety.

FIELD OF THE INVENTION

The invention relates to a turbocharger with a compressor arrangement which is configured to compress the fresh air of an internal combustion engine, comprising at least one compressor housing with a fresh air inlet and a fresh air outlet, at least one compressor impeller being arranged in the compressor housing, and with at least one exhaust gas turbine for driving the compressor arrangement, with at least one turbine housing with an exhaust gas inlet and an exhaust gas outlet, at least one turbine wheel being arranged in the turbine housing.

BACKGROUND

It is known in practice to equip an internal combustion engine with at least one turbocharger. The turbocharger contains a turbine which extracts kinetic energy from the exhaust gas flow and provides it as mechanical power. This mechanical power is used to drive a compressor arrangement by means of which the fresh air required for combustion can be supplied to the internal combustion engine at increased pressure. This can optimize the response characteristic, the output and/or the consumption.

It is also known in practice to supply the exhaust gases from an internal combustion engine to at least one exhaust gas aftertreatment device. The exhaust gas aftertreatment device can, for example, contain a particulate filter and/or at least one catalytic converter. This can retain soot particles or oxidize or reduce pollutants, such as CO, $CH_x$ or $NO_x$, thus rendering them harmless.

All known catalytic converters require an operating temperature higher than normal ambient conditions in order to remove pollutants from the exhaust gas to a significant extent. Although a particulate filter works reliably even after a cold start, it has to be regenerated from time to time at an elevated temperature.

Therefore, WO 2020/193595 A1 discloses a heated catalytic converter which is designed to convert supplied fuel with exhaust gas or fresh air. The heated catalytic converter can be operated in different operating states. For example, the supplied fuel can simply be vaporized in order to be oxidized at an exhaust gas aftertreatment device, as a result of which heat is released and the exhaust gas aftertreatment device is heated up. In other operating states, at least some of the fuel can be converted into a synthesis gas, which has a lower light-off temperature at the exhaust gas aftertreatment device and thus renders possible better heating of the exhaust gas aftertreatment device in some operating states of the internal combustion engine. Finally, the fuel can be completely converted in the heated catalytic converter in order to thus generate a hot gas which is supplied to the exhaust gas aftertreatment device and heats it up.

The disadvantage of this known heated catalytic converter is that it requires additional installation space which can be particularly limited in passenger cars and lightweight commercial vehicles.

On the basis of the prior art, this object of the invention is therefore to provide a device for rapidly heating an exhaust gas aftertreatment device of an internal combustion engine, which requires little installation space and is also suitable for retrofitting existing internal combustion engines.

SUMMARY OF THE INVENTION

According to the invention, the object is achieved by a turbocharger according to claim 1. Advantageous further developments of the invention are found in the subclaims.

According to the invention, a turbocharger is proposed which has at least one compressor arrangement and at least one exhaust gas turbine. The compressor arrangement is designed to compress the fresh air to be supplied to an internal combustion engine. For this purpose, the compressor arrangement contains at least one compressor housing having a fresh air inlet and a fresh air outlet, at least one compressor impeller being arranged in the compressor housing. The fresh air required for the combustion of the fuel in the internal combustion engine is supplied to the compressor arrangement through the fresh air inlet at a first pressure and leaves the fresh air outlet at a second pressure, the second pressure being higher than the first pressure. Therefore, the compressor arrangement adds mechanical work to the fresh air.

The at least one compressor impeller can have a plurality of rotor blades and operate as a radial compressor or axial compressor. In other embodiments of the invention, the at least one compressor impeller can be part of a screw compressor or a Roots blower or a swash plate compressor. The invention does not teach the use of a particular design of compressor arrangement as a solution principle.

The at least one exhaust gas turbine is designed to drive the compressor arrangement. For this purpose, the exhaust gas turbine on the one hand and the compressor arrangement on the other hand can be connected to each other by a rotating shaft, a gearbox, a belt drive or in another manner known per se. The at least one exhaust gas turbine has at least one turbine housing having an exhaust gas inlet and an exhaust gas outlet, at least one turbine wheel being arranged in the turbine housing. The exhaust gas turbine is designed to extract energy from the exhaust gas flow and provide it as mechanical power. In this respect, an exhaust gas flow from the internal combustion engine is supplied to the turbine housing at a second pressure via the exhaust gas inlet and discharged at a first pressure via the exhaust gas outlet, the second pressure being higher than the first pressure.

The turbocharger according to the invention also has a heated catalytic converter which is designed to at least partially convert supplied fuel with fresh air and/or exhaust gas, the heated catalytic converter containing a catalytic converter housing having at least one gas inlet and at least one gas outlet and at least one fuel inlet. Fresh air and/or exhaust gas is supplied via the gas inlet. Fuel, for example gasoline or diesel, is supplied to the heated catalytic converter via the fuel inlet. A product gas is produced in the heated catalytic converter from fuel and exhaust gas and/or fresh air. For this purpose, the fuel is vaporized in the heated catalytic converter and/or at least partially oxidized with the release of heat and/or converted into a synthesis gas via cracking reactions. The product gas thus contains a hot gas and/or fuel vapor and/or synthesis gas. The product gas leaves the heated catalytic converter via the gas outlet and is supplied back into the exhaust pipe downstream of the exhaust gas turbine. Therefore, the turbulence generated by the exhaust gas turbine can be used to mix the product gas produced in the heated catalytic converter with the exhaust gas. Exhaust gas and/or fresh air can be supplied at the respective second pressure via the gas inlet and discharged into the exhaust gas flowing at the first pressure, resulting in a reliable flow through the catalytic converter housing without an additional conveying device. In some embodiments of the invention, the heated catalytic converter is designed to vaporize supplied fuel by means of a fleece without coking.

According to the invention, it is now proposed that the catalytic converter housing on the one hand and the compressor housing and/or the turbine housing on the other hand are in thermal contact on at least one part surface. On the one hand, this leads to a compact design since the turbocharger with integrated heated catalytic converter requires hardly any more installation space than a known turbocharger without the additional functionality of a heated catalytic converter. In addition, internal combustion engines having a turbocharger and being already in use can be easily retrofitted with the heating device according to the invention by replacing the existing turbocharger with the turbocharger according to the invention. In this way, additional thermal energy can be introduced into an exhaust gas aftertreatment device without reducing the efficiency of the internal combustion engine through in-engine measures.

Furthermore, the waste heat generated during the operation of the turbocharger can be supplied to the heated catalytic converter so that the heated catalytic converter itself reaches operating temperature more quickly. As a result, the supply of electrical auxiliary energy to the heated catalytic converter can be reduced or completely avoided so that the heated catalytic converter can be operated in a consumption-optimized manner.

In some embodiments of the invention, the turbocharger further contains a first overflow channel having a first end and an opposite second end, the first end being connected to the exhaust gas inlet of the turbine housing and the second end being connected to the gas inlet of the catalytic converter housing. This makes it possible to supply the heated catalytic converter with exhaust gas which on the one hand introduces thermal energy into the heated catalytic converter in order to render possible or promote the conversion of the fuel at the catalytic converter in this way or to vaporize fuel, i.e. to convert it from the liquid to the gaseous state. In addition, the exhaust gas can be used as an oxidizing agent to oxidize at least part of the fuel and thus release heat. Oxygen-rich exhaust gas is particularly suitable for this purpose and is produced, for example, during lean operation (air number $\lambda > 1$) of a spark-ignition internal combustion engine or generally in the case of self-igniting internal combustion engines.

In some embodiments of the invention, the turbocharger can include at least one second overflow channel having a first end and an opposite second end, the first end being connected to the fresh air outlet of the compressor housing and the second end being connected to the gas inlet of the catalytic converter housing. The second overflow channel is thus used to supply fresh air to the heated catalytic converter. Just like the exhaust gas, the compressed fresh air can also be used to add additional thermal energy to the heated catalytic converter. Furthermore, the fresh air is suitable as an oxidizing agent for the fuel supplied to the heated catalytic converter. In this way, oxidation of the fuel can be ensured independently of the operating state of the internal combustion engine since oxidation can take place independently of the composition of the raw exhaust gas.

In some embodiments of the invention, the turbocharger can contain a third overflow channel which has a first end and an opposite second end, the first end being connected to the gas outlet of the catalytic converter housing and the second end being connected to the exhaust gas outlet of the turbine housing. The third overflow channel is thus suitable and intended for supplying the product gas generated in the heated catalytic converter downstream of the exhaust gas turbine to the exhaust pipe. As already described above, the product gas may be or contain a fuel vapor. In other embodiments of the invention, the product gas may be or contain a synthesis gas obtained by reacting the fuel on the heated catalytic converter. In yet other embodiments of the invention, the product gas may be a hot gas or contain a hot gas obtained by oxidizing the fuel on the heated catalytic converter. Since the heated catalytic converter is thus supplied with exhaust gas or fresh air at a comparatively high pressure level upstream of the exhaust gas turbine and the product gas of the heated catalytic converter is supplied at a lower pressure downstream of the exhaust gas turbine, the pressure drop within the exhaust gas turbine inevitably results in a flow of exhaust gas or fresh air through the heated catalytic converter.

It goes without saying that the first, second or third overflow channel need not be present in all embodiments of the invention. In some embodiments of the invention, there may be only one or only two of these overflow channels.

In some embodiments of the invention, the first overflow channel and/or the second overflow channel and/or the third overflow channel may be designed, at least in sections, as a bore in the catalytic converter housing or in the compressor housing or in the turbine housing. A bore of this type can be created either by machining or during the primary forming of the housing. On the one hand, this results in a simple production of the turbocharger according to the invention and a mechanically robust operation, as there is no need for wear-prone plastics or rubber hoses as well as connection points for hoses to the housing.

In some embodiments of the invention, at least one nozzle can be arranged on the second end of the third overflow channel. This allows the product gas of the heated catalytic converter to be introduced into the exhaust gas flow with a predeterminable direction and/or a predeterminable pulse so that the mixing of the product gas with the exhaust gas flow is additionally promoted.

In some embodiments of the invention, a two-way valve may be provided in the first overflow channel and/or in the second overflow channel and/or in the third overflow channel. A two-way valve of this type can be influenced by an electrical signal from a control device so that the flow in the respective overflow channel can be controlled in open-loop or closed-loop fashion. As a result, depending on the operating state, exhaust gas or fresh air or a mixture of exhaust gas and fresh air can be supplied to the heated catalytic converter or the heated catalytic converter can be completely deactivated by closing at least one overflow channel. In some embodiments of the invention, the overflow channels can be used as a wastegate valve by discharging impermissibly high boost pressure through the heated catalytic converter into the exhaust line or by bypassing exhaust gas past the exhaust gas turbine. An additional wastegate valve can thus be dispensed with.

In some embodiments of the invention, the turbocharger can further contain a three-way valve which has three inlets/outlets to which the first overflow channel and the second overflow channel and the gas inlet are connected. The position of the three-way valve can be used to supply the heated catalytic converter with fresh air or exhaust gas or a mixture of fresh air and exhaust gas so that the operating state of the heated catalytic converter can be adjusted over a wide range using a single valve. By closing the three-way valve, the heated catalytic converter can be taken out of operation, for example at full load or operating conditions close to full load, which do not require any additional heating measures for the exhaust gas aftertreatment.

In one embodiment of the invention, at least part of the catalytic converter housing and either the compressor housing or the turbine housing can be manufactured in one piece. A one-piece production of this type can be achieved in particular by primary forming in a casting method. In other embodiments of the invention, the housings can be manufactured at least partially in a 3D printing method. In this way, at least one part of the catalytic converter housing and at least one part of the compressor housing or of the turbine housing can be integrally bonded so that heat from the compressor housing or the turbine housing can be introduced into the heated catalytic converter with little loss. In this way, it is possible to avoid raw contact surfaces and/or contact surfaces oxidized after prolonged operation which have a comparatively high heat input resistance.

In some embodiments of the invention, at least a part of the catalytic converter housing and at least a part of the compressor housing and at least a part of the turbine housing can be manufactured in one piece. This results in a mechanically robust and compact design of the entire turbocharger.

In some embodiments of the invention, a heat flow of about 0.5 kW to about 6 kW can be introduced into the heated catalytic converter due to the thermal contact between the catalytic converter housing on the one hand and the compressor housing or the turbine housing on the other hand. In other embodiments of the invention, the heat flow introduced into the heated catalytic converter by the thermal contact can be between about 1 kW and about 4 kW. In yet other embodiments of the invention, the heat input can be between about 0.5 kW and about 3 kW. The above-mentioned heat outputs permit the efficient vaporization and/or conversion of fuel in the heated catalytic converter without additional electrical auxiliary energy. The internal combustion engine can therefore be operated in a consumption-optimized manner.

BRIEF DESCRIPTION OF THE DRAWINGS

The invention shall be explained in more detail below on the basis of drawings without limiting the general concept of the invention. Here.

DETAILED DESCRIPTION

Figure 1:
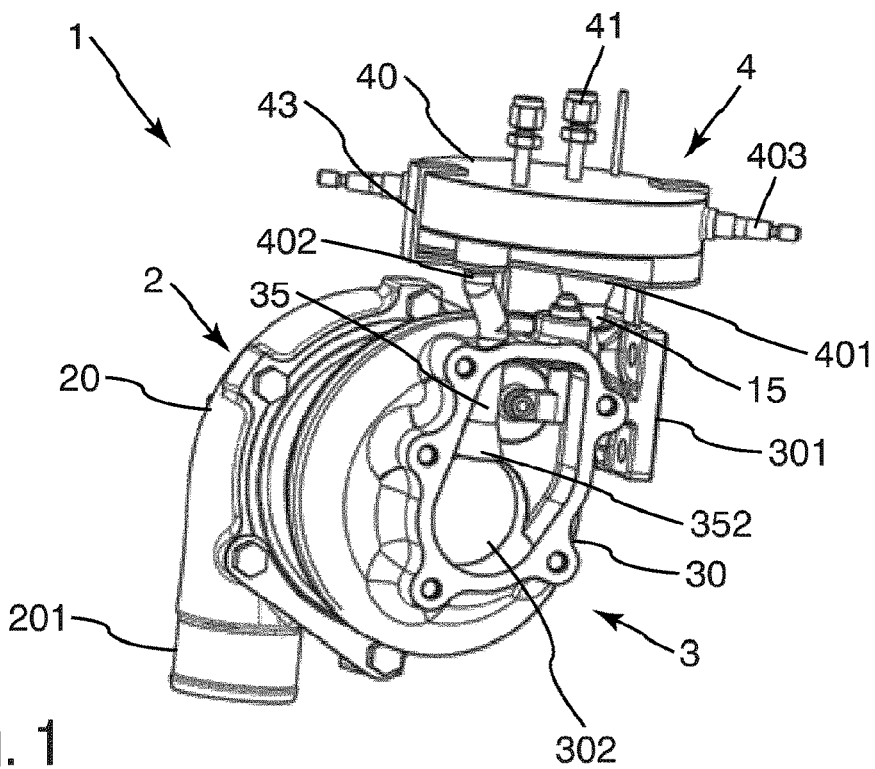
FIG. 1 shows a first view of a first embodiment of the turbocharger according to the invention.
Figure 2:
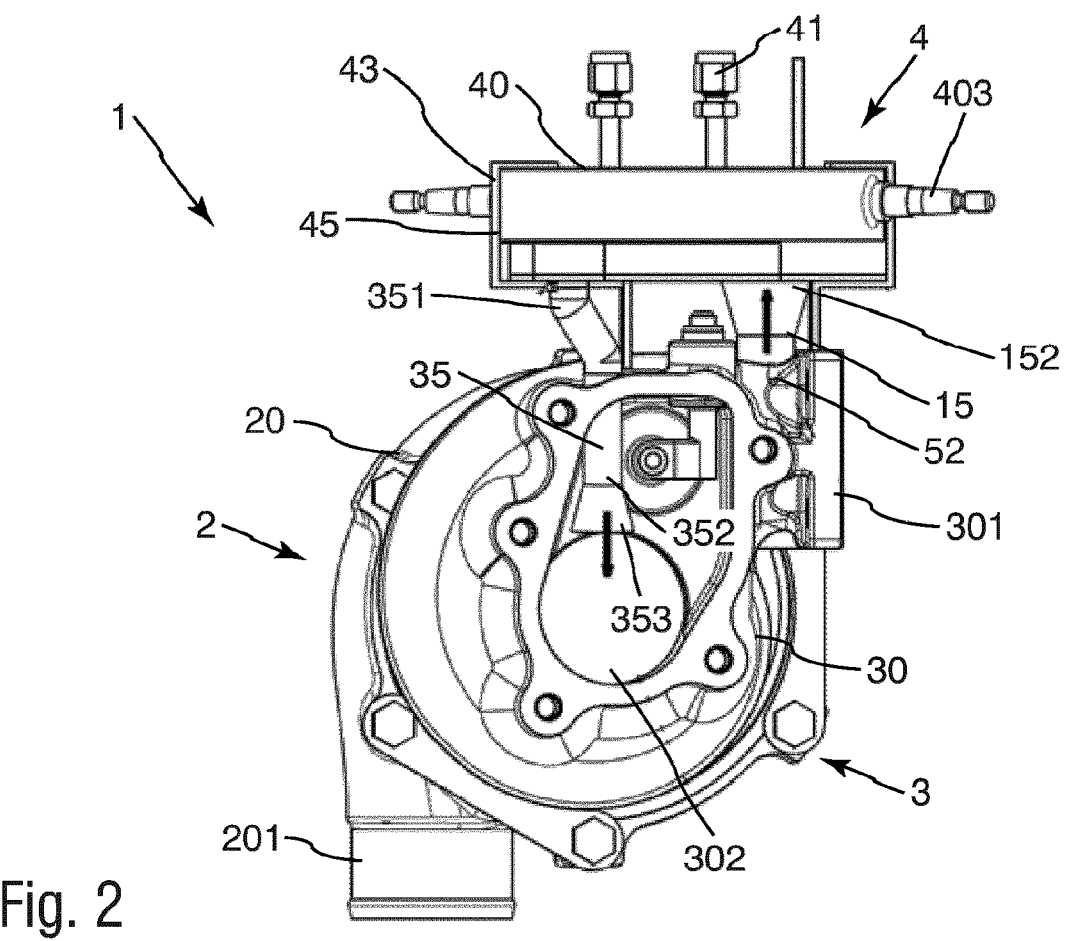
FIG. 2 shows a second view of the first embodiment of the turbocharger according to the invention.
Figure 3:
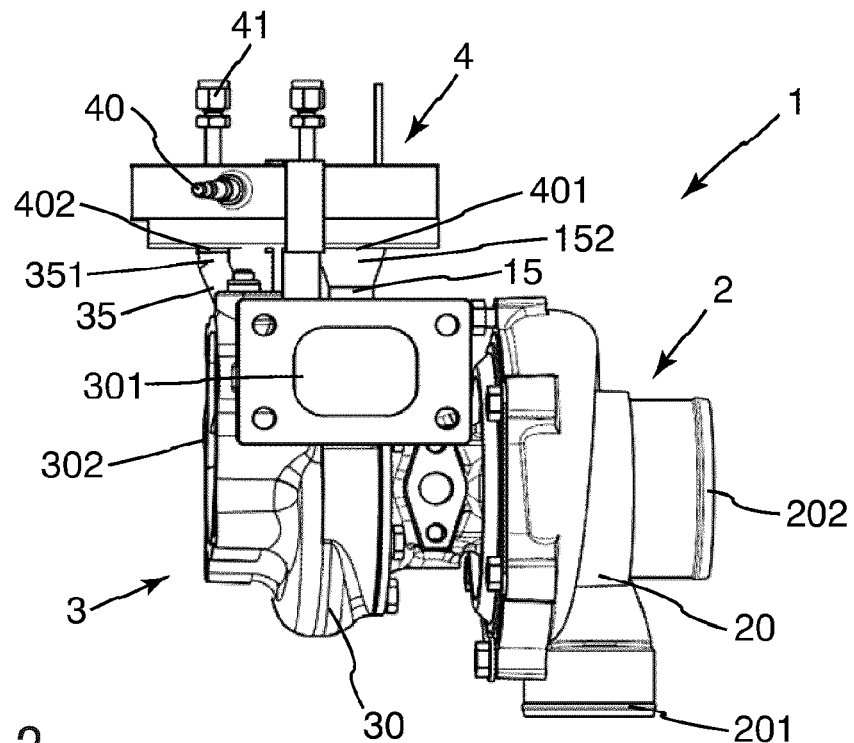
FIG. 3 shows a third view of the first embodiment of the turbocharger according to the invention.

FIGS. 1 to 3 illustrate a first embodiment of the turbocharger according to the invention. The turbocharger 1 contains a compressor arrangement 2, which is designed to compress the fresh air required for combustion in an internal combustion engine. In the illustrated exemplary embodiment, the compressor arrangement 2 is designed as a radial compressor. The compressor arrangement 2 has a fresh air inlet 201, which is designed to draw in ambient air at a first pressure. Furthermore, the compressor arrangement 2 has a fresh air outlet 202, which is designed to discharge the compressed fresh air at a second pressure. The fresh air outlet 202 can then be connected to the intake manifold of an internal combustion engine and supply the fresh air required for the combustion of the fuel in the internal combustion engine to the internal combustion engine at increased pressure.

An exhaust gas turbine 3 having at least one turbine housing 30 is used to drive the compressor arrangement. The turbine housing 30 has an exhaust gas inlet 301 and an exhaust gas outlet 302, at least one turbine wheel being arranged in the turbine housing 30. In the illustrated exemplary embodiment, the exhaust gas turbine is also designed as a radial turbine, i.e. the exhaust gas inlet 301 and the exhaust gas outlet 302 are arranged approximately at right angles to one another.

In some embodiments of the invention, the turbine housing 30 and the compressor housing 20 can be manufactured in one piece, for example as a cast part or in a 3D printing method. In other embodiments of the invention, the housings can be made in several parts or be separated and connected to one another by means of screw connections.

FIGS. 1 to 3 also show a heated catalytic converter 4. The heated catalytic converter 4 has a housing 40 having a roughly cylindrical main shape. A gas inlet 401 is located on the underside of the housing 4, through which exhaust gas and/or fresh air can be supplied to the heated catalytic converter 4. Furthermore, the heated catalytic converter 4 has at least one fuel inlet 403. A gaseous or liquid fuel, usually gasoline or diesel, can be supplied via the fuel inlet 403. The fuel can be completely or partially converted in the above described manner with the exhaust gas or fresh air supplied via the gas inlet 401. The product gas generated in the heated catalytic converter 4 in this way leaves the heated catalytic converter 4 via the gas outlet 402.

Furthermore, FIGS. 1 to 3 show a holding bracket 43, which can be made of a thermally conductive material, for example a metal or an alloy. The holding bracket is designed to mechanically fix the catalytic converter housing 40 of the heated catalytic converter 4. One end of the holding bracket 43 facing away from the catalytic converter housing 40 is in mechanical and thermally conductive contact with the turbine housing 30. During operation of the turbocharger, hot exhaust gas flows through the turbine housing 30. This causes the turbine housing 30 to heat up. Some of the heat is released into the environment by convection and radiation. However, some of the heat introduced into the turbine housing 30 flows into the heated catalytic converter 4 via the holding bracket 43 and the part surface 45 formed between the catalytic converter housing 40 and the holding bracket 43. For this purpose, the catalytic converter housing 40 can be made at least partially from a thermally conductive material, for example a metal or an alloy. In this way, the heated catalytic converter 4 can be brought without or with a reduced supply of electrical auxiliary energy to an increased temperature, at which the fuel can be converted with fresh air or exhaust gas.

As can also be seen in the drawings, the catalytic converter housing 40 can also have further ports 41. Temperature sensors or electrical heating devices can be connected via these ports. Optionally, more than one fuel inlet 403 can be provided to render possible a more homogeneous distribution of the fuel within the heated catalytic converter 4.

As further shown in figures 1 and 2, the turbocharger according to the present invention also contains a first overflow passage 15 having a first end 151 and a second end 152. The first end 151 is connected to the exhaust gas inlet 301 of the turbine housing 30. In this way, the exhaust gas flow leaving the internal combustion engine at a comparatively high pressure, for example about 3.5 to about 5 bar, can be at least partially extracted and supplied to the heated catalytic converter 4. For this purpose, the second end 152 of the first overflow channel 15 is connected to the gas inlet 401 of the catalytic converter housing 40. An optional two-way valve (not shown in the drawings) can be located in the overflow channel 15, by means of which valve the amount of exhaust gas supplied to the heated catalytic converter 4 can be controlled.

Figure 6:
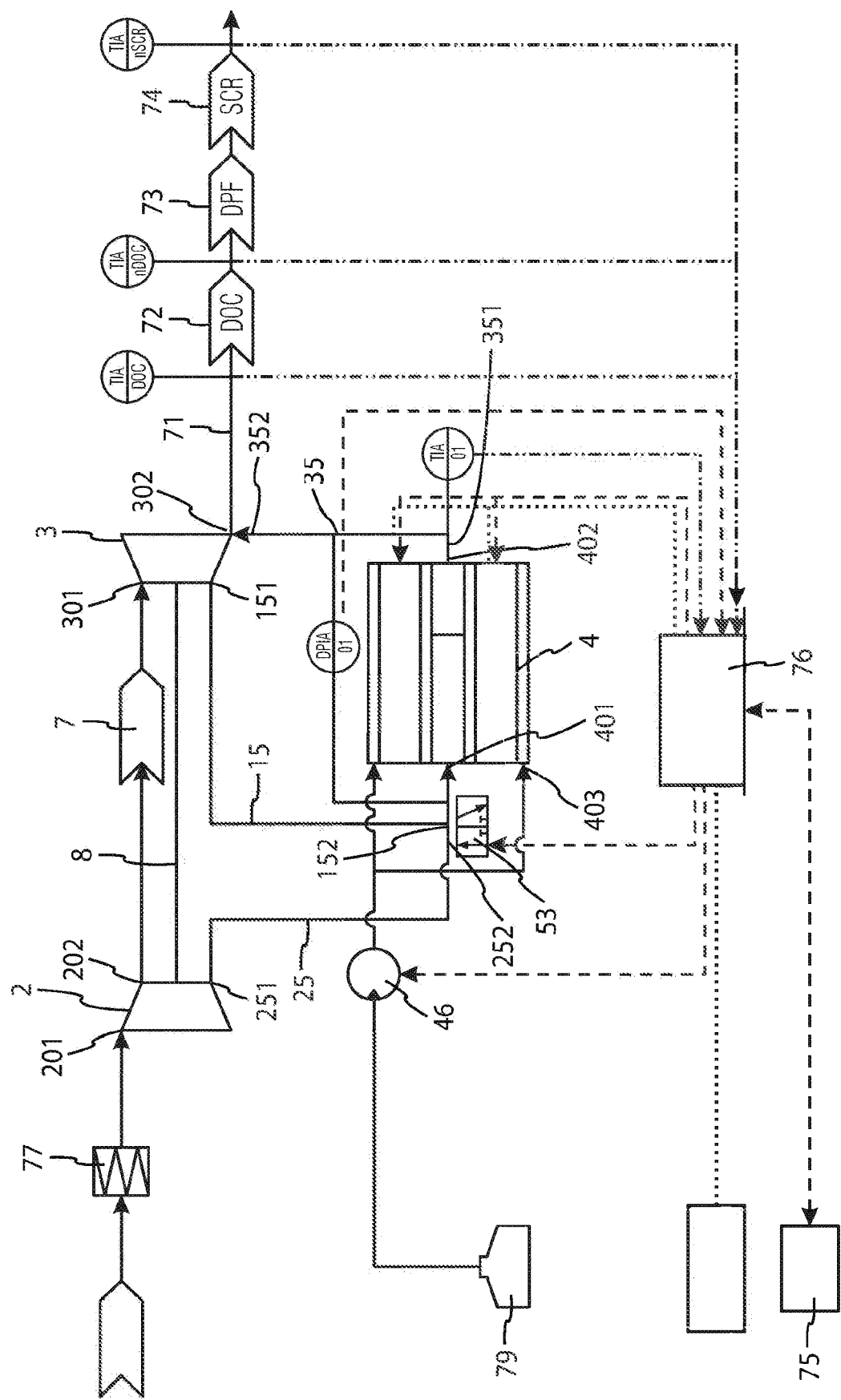
FIG. 6 shows a block diagram of an internal combustion engine having an exhaust gas aftertreatment device and a turbocharger according to the invention.

Furthermore, the turbocharger according to the first embodiment of the invention includes a third overflow channel 35 having a first end 351 and an opposite second end 352. The first end 351 is here connected to the gas outlet 402 of the catalytic converter housing 40. The second end 352 opens with an optional nozzle 353 downstream of the turbine wheel in the turbine housing 30. Thus, as best seen in FIG. 6, a product gas emerging from the catalytic converter 4 at gas outlet 402 bypasses the turbine 3 and is directed into the exhaust pipe 71 downstream of the turbine 3, via the third overflow channel 35. Downstream of the turbine wheel, a lower pressure is created on the one hand, since the turbine wheel draws energy from the exhaust gas flow. In addition, the turbine wheel causes turbulence and therefore good mixing of the product gas generated in the heated catalytic converter 4 with the main exhaust gas flow. The pressure difference results in a defined flow of exhaust gas through the heated catalytic converter 4. At the same time, the turbocharger according to the invention has a compact design, which saves installation space and makes it easy to retrofit existing internal combustion engines.

Figure 4:
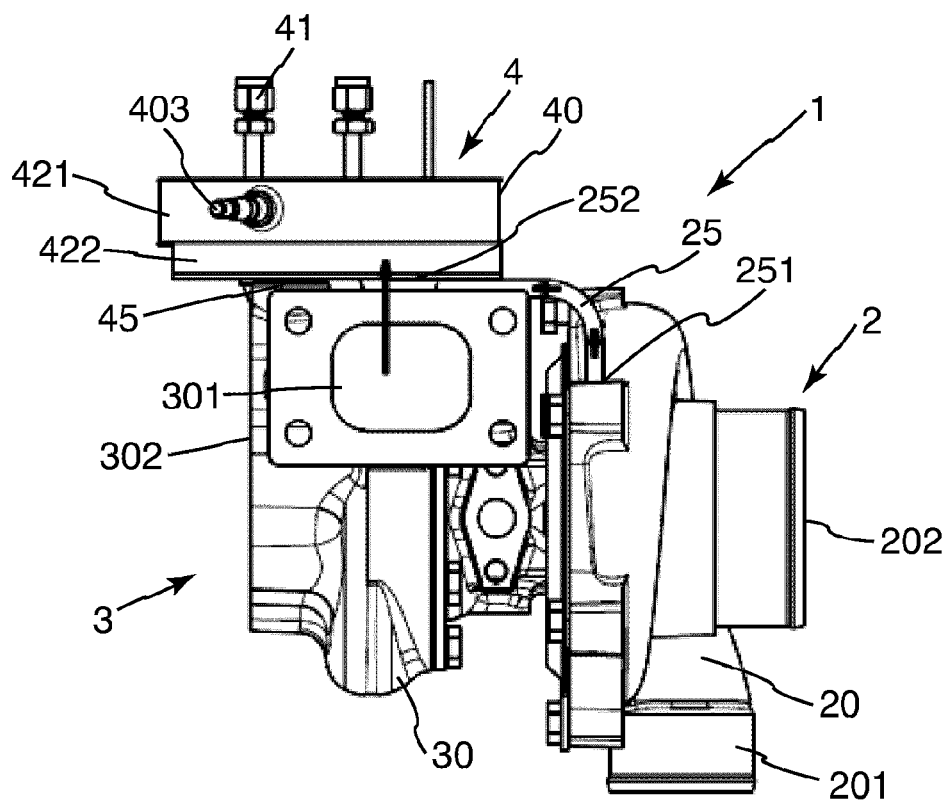
FIG. 4 shows a first view of a second embodiment of the turbocharger according to the invention.
Figure 5:
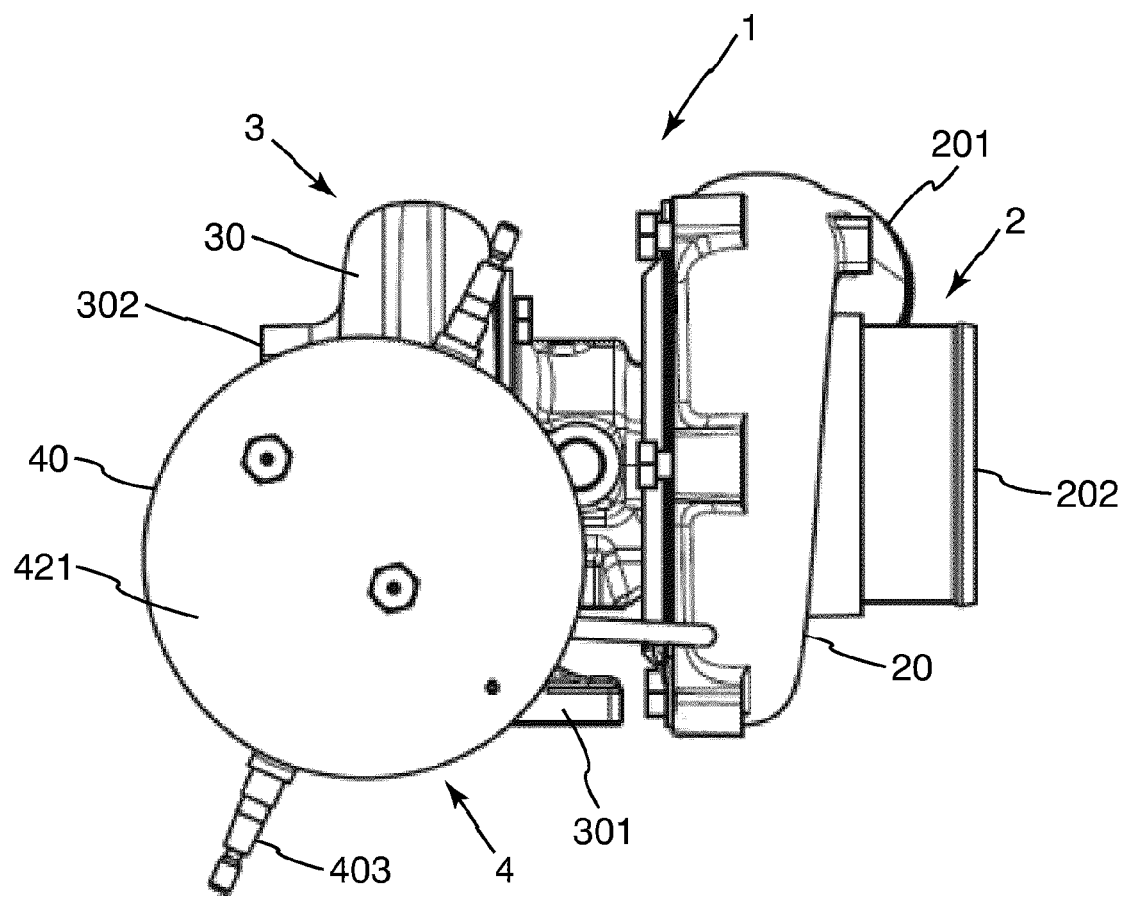
FIG. 5 shows a second view of the second embodiment of the turbocharger according to the invention.

FIGS. 4 and 5 illustrate a second embodiment of the invention in more detail. Identical components of the invention are provided with identical reference signs so that the following description is limited to the essential differences of the invention.

As is clear from FIG. 4, the second embodiment dispenses with a holding bracket 43 for the mechanical and thermal coupling of the turbine housing 30 and the catalytic converter housing 40. According to the second embodiment, the catalytic converter housing 40 is designed in two parts with a lower part 422 and an upper part 421. In the illustrated exemplary embodiment, the lower part 422 of the catalytic converter housing 40 is manufactured in one piece together with the turbine housing 30, i.e. during the primary forming of the turbine housing 30 in a metal casting method, the lower part 422 is also manufactured in the same method step as a homogeneous component of the turbine housing 30.

Due to the one-piece or monolithic production of the lower part 422 of the catalytic converter housing 40 and the turbine housing 30, there is no interface at the part surface 45, which causes thermal coupling of the two components and impedes heat input due to unevenness, contamination or oxidation. The heat input from the turbine housing 30 to the catalytic converter housing 40 can therefore be more homogeneous and/or more effective. In other embodiments of the invention, such an integrally bonded connection of at least one part of the catalytic converter housing and the turbine housing can also be achieved by soldering, welding or 3D printing.

In the case of the monolithic production according to the second embodiment of the invention, the overflow channels 15, 25 and 35 can also be produced in a simple manner by recesses or bores in the housing. In addition, two-way or three-way valves can also be integrated into the housing and can influence the supply of exhaust gas or fresh air on the one hand and the removal of product gas on the other hand in order to adapt the operating parameters of the heated catalytic converter 4 to predeterminable target conditions.

FIG. 6 shows a block diagram of an internal combustion engine 7 having an exhaust gas aftertreatment device 72, 73 and 74 and a turbocharger according to the invention. For reasons of clarity, the compressor arrangement 2, the exhaust gas turbine 3 and the heated catalytic converter 4 are spatially separated in FIG. 6. A person skilled in the art is of course aware that these components of the invention work together, as described above with reference to FIGS. 1 to 5.

The internal combustion engine 7 can be a self-ignition or spark-ignition internal combustion engine. The internal combustion engine 7 is designed to provide mechanical power by burning fuel with ambient air. The internal combustion engine 7 can be used in a car, a truck, a ship, a construction machine or in stationary fashion in a compressor, a generator, a combined heat and power unit or a similar device.

During operation, the internal combustion engine 7 is supplied with fresh or ambient air via an air filter 77. The fresh air is brought to a higher pressure level in the compressor arrangement 2. For this purpose, the fresh air is supplied to the fresh air inlet 201, compressed with a compressor impeller and then supplied to the internal combustion engine 7 via the fresh air outlet 202.

The compressor arrangement is driven by a rotating shaft 8, the drive power of which is provided by an exhaust gas turbine 3. For this purpose, the exhaust gas from the internal combustion engine 7 is supplied into the exhaust gas turbine via the exhaust gas inlet 301. The exhaust gas then leaves the exhaust gas turbine 3 via an exhaust gas outlet 302.

The exhaust gas is then supplied via an exhaust pipe 71 to an exhaust gas aftertreatment device, which can reduce soot particles and gaseous pollutants. In the illustrated exemplary embodiment, the exhaust gas aftertreatment device contains an oxidation catalytic converter 72, which is designed to oxidize hydrocarbons and carbon monoxide. The exhaust gas pre-treated in this way reaches a particulate filter 73, which retains fine dust particles. The exhaust gas is then supplied into an SCR catalytic converter 74, which reduces nitrogen oxides with the addition of urea. Exhaust gas temperatures can be measured at different points using various temperature sensors TIA to control the heated catalytic converter 4 and the internal combustion engine 7 in an open-loop or closed-loop fashion.

The oxidation catalytic converter 72 and the SCR catalytic converter 74 require elevated temperatures of more than 250° C., for example, in order to operate. The particulate filter 73 is also functional at low temperatures, but must be operated at elevated temperatures from time to time in order to oxidize embedded particles and regenerate the particulate filter in this way. There is therefore a need to bring the exhaust gas flowing in the exhaust pipe 71 to predeterminable temperatures or to keep it at elevated temperatures. According to the prior art, this can be achieved by appropriate operating conditions of the internal combustion engine 7, for example by late or post-injection. However, this worsens the exhaust gas behavior and increases the fuel requirement of the internal combustion engine 7.

According to the invention, it is therefore proposed to use a heated catalytic converter 4 which is designed to introduce heat into at least one component 72, 73, 74 of the exhaust gas aftertreatment device. For this purpose, fuel is supplied to the heated catalytic converter 4 from a storage tank 79 via an electrically driven pump 46, which fuel enters the catalytic converter housing 40 of the heated catalytic converter 4 via a fuel inlet 403. A catalytic converter support, which is coated with a catalyst material, is arranged inside the catalytic converter housing 4.

In the simplest case, the fuel entering via the fuel inlet 403 can be vaporized in the heated catalytic converter 4 and leave the catalytic converter housing 4 via the gas outlet 402. By means of a third overflow channel 35 having a first end 351 and an opposite second end 352, this fuel vapor can be introduced into the exhaust pipe 71, the turbulence generated by the exhaust gas turbine 3 ensuring effective mixing. The fuel vapor can then be oxidized at the oxidation catalyst 72 and/or a downstream component 73 or 74, where it releases heat.

In other operating states, the fuel can be converted in the heated catalytic converter 4 with exhaust gas and/or fresh air so that either a hot gas or a synthesis gas is formed, which can be supplied to the exhaust pipe 71 via the third overflow channel 35 in the same way. A synthesis gas can also be converted at the oxidation catalytic converter 72 or a downstream component 73, 74, it being possible that the light-off temperature is reduced compared to vaporized but chemically unchanged fuel.

In order to convert the fuel with exhaust gas or fresh air, the heated catalytic converter 4 also contains a gas inlet 401. The gas inlet 401 is connected via a three-way valve 53 to a first overflow channel 15 and a second overflow channel 25. The first overflow channel 15 is connected via its first end 151 to the gas inlet 301 of the exhaust gas turbine 3 so that exhaust gas can be extracted at a comparatively high pressure level and supplied to a port of the three-way valve 53. Furthermore, the illustrated embodiment contains a second overflow channel 25, the first end 251 of which is connected to the fresh air outlet 202 of the compressor arrangement 2. The opposite second end 252 is connected to a further port of the three-way valve 53. Depending on the position of the three-way valve 53, fresh air or exhaust gas or both can thus be supplied into the catalytic converter housing 40 of the heated catalytic converter 4 via the gas inlet 401. The oxygen content in the heated catalytic converter 4 can thus be adjusted by the position of the three-way valve 53 so that the type of conversion of the supplied fuel can be influenced.

Both the conversion of the fuel in the heated catalytic converter 4 and the mere vaporization require thermal energy which can, on the one hand, can be generated by at least partial oxidation of the fuel in the heated catalytic converter 4. In addition, however, this energy can also be realized according to the invention by thermal coupling of the heated catalytic converter 4 to the exhaust gas turbine 3 and/or the compressor arrangement 2.

An electronic open-loop or closed-loop control device 76 is available for driving the amount of fuel supplied and the three-way valve 53 and, if necessary, further components of the heated catalytic converter 4. This device can optionally be connected to the engine control unit 75 via a data bus so that the operating conditions of the internal combustion engine 7 can also be taken into account when driving the heated catalytic converter 4.

The complete integration of the heated catalytic converter 4 into the exhaust gas turbocharger also makes it possible to save on additional components. In the illustrated exemplary embodiment, the three-way valve 53 can also be used to replace a wastegate valve. For this purpose, if the pressure at the fresh air outlet 202 rises unacceptably, the fuel supply to the heated catalytic converter 4 can be interrupted and the three-way valve 53 can be opened so that exhaust gas flows through the heated catalytic converter 4 from the high-pressure side of the exhaust gas turbine 3 to the low-pressure side without generating additional heat.

Of course, the invention is not limited to the illustrated embodiments. Therefore, the above description should not be regarded as restrictive but as explanatory. The following claims are to be understood in such a way that a stated feature is present in at least one embodiment of the invention. This does not exclude the presence of further features. If the claims and the above description define "first" and "second" embodiments, this designation is used to distinguish between two similar embodiments without determining a ranking order.

What is claimed is:

1. A turbocharger (1) comprising:
   a compressor arrangement (2) configured to compress fresh air entering an internal combustion engine, the compressor arrangement comprising at least one compressor housing (20) having a fresh air inlet (201), a fresh air outlet (202), and at least one compressor impeller arranged in the compressor housing (20);
   at least one exhaust gas turbine (3) configured to drive the compressor arrangement (2), the at least one exhaust gas turbine comprising at least one turbine housing (30) having an exhaust gas inlet (301), an exhaust gas outlet (302), and at least one turbine wheel being arranged in the turbine housing (30);
   a heated catalytic converter (4) configured to at least partially convert supplied fuel with fresh air and/or exhaust gas, the heated catalytic converter (4) comprising a catalytic converter housing (40) having a gas inlet (401) and a gas outlet (402) and a fuel inlet (403); and
   a third overflow channel (35) having a first end (351) connected to the gas outlet (402) of the catalytic converter housing (40) and a second end (352) connected to the exhaust gas outlet (302) of the turbine housing (30), such that a product gas generated in the heated catalytic converter (4) bypasses the turbine (3) and is directed into an exhaust pipe (71) downstream of the turbine (3), via the third overflow channel (35);
   wherein:
   the catalytic converter housing (40) and the compressor housing (20) are in thermal contact on at least one part surface (45); and/or
   the catalytic converter housing (40) and the turbine housing (30) are in thermal contact on at least one part surface (45).

2. A turbocharger according to claim 1, further comprising:
   a first overflow channel (15) having a first end (151) and an opposite second end (152), wherein the first end (151) is connected to the exhaust gas inlet (301) of the turbine housing (30) and the second end (152) is connected to the gas inlet (401) of the catalytic converter housing (40).

3. A turbocharger according to claim 2, further comprising:
   a second overflow channel (25) having a first end (251) and an opposite second end (252), wherein the first end (251) is connected to the fresh air outlet (202) of the compressor housing (20) and the second end (252) is connected to the gas inlet (401) of the catalytic converter housing (40).

4. A turbocharger according to claim 3, further comprising:
a 3-way valve (53) with three inlets/outlets, to which the first overflow channel (15), the second overflow channel (25) and the gas inlet (401) are connected.

5. A turbocharger according to claim 1, wherein:
at least one nozzle (353) is arranged on the second end (352) of the third overflow channel (35).

6. A turbocharger according to claim 1, wherein:
the first overflow channel (15) and/or the second overflow channel (25) and/or the third overflow channel (35) is designed at least in sections as a bore in the catalytic converter housing (40) and/or in the compressor housing (20) and/or in the turbine housing (30).

7. A turbocharger according to claim 1, wherein:
a 2-way valve (52) is present in the first overflow channel (15) and/or in the second overflow channel (25) and/or in the third overflow channel (35).

8. A turbocharger according to claim 1, wherein:
at least one part (422) of the catalytic converter housing (40), the compressor housing (20) and the turbine housing (30) are manufactured together in one piece to have monolithic construction.

9. A turbocharger according to claim 8, wherein:
the first overflow channel (15) and/or the second overflow channel (25) and/or the third overflow channel (35) is designed at least in sections as a bore in the catalytic converter housing (40) and/or in the compressor housing (20) and/or in the turbine housing (30).

10. A turbocharger according to claim 1, wherein:
at least one part (421, 422) of the catalytic converter housing (40) and either the compressor housing (20) or the turbine housing (30) are manufactured together in one piece to have monolithic construction.

11. A turbocharger according to claim 10, wherein:
the catalytic converter housing (40) and at least either the compressor housing (20) or the turbine housing (30) are manufactured as a cast part.

12. A turbocharger according to claim 1, wherein:
at least one part (422) of the catalytic converter housing (40), the compressor housing (20) and the turbine housing (30) are manufactured together in one piece to have monolithic construction.

13. A turbocharger according to claim 1, wherein:
at least one part (421, 422) of the catalytic converter housing (40) and either the compressor housing (20) or the turbine housing (30) are manufactured together in one piece to have monolithic construction.

14. A turbocharger according to claim 13, wherein:
the catalytic converter housing (40) and at least either the compressor housing (20) or the turbine housing (30) are manufactured as a cast part.

15. A turbocharger according to claim 1, wherein:
when exhaust gas flows through the turbine housing (30), a heat flow of about 0.5 kW to about 6 kW is introduced into the catalytic converter housing (40) by thermal contact between:
(a) the catalytic converter housing (40) and the compressor housing (20); and/or
(b) the catalytic converter housing (40) and the turbine housing (30).

16. A method for modifying an internal combustion engine having a turbocharger, comprising:
removing the existing turbocharger and
installing a turbocharger is accordance with claim 1.

* * * * *